July 10, 1962     C. S. MORRISON ETAL     3,043,418
BALE-HANDLING APPARATUS

Filed Jan. 2, 1959     2 Sheets-Sheet 1

INVENTORS
C. S. MORRISON
M. W. FORTH

July 10, 1962  C. S. MORRISON ETAL  3,043,418
BALE-HANDLING APPARATUS
Filed Jan. 2, 1959  2 Sheets-Sheet 2
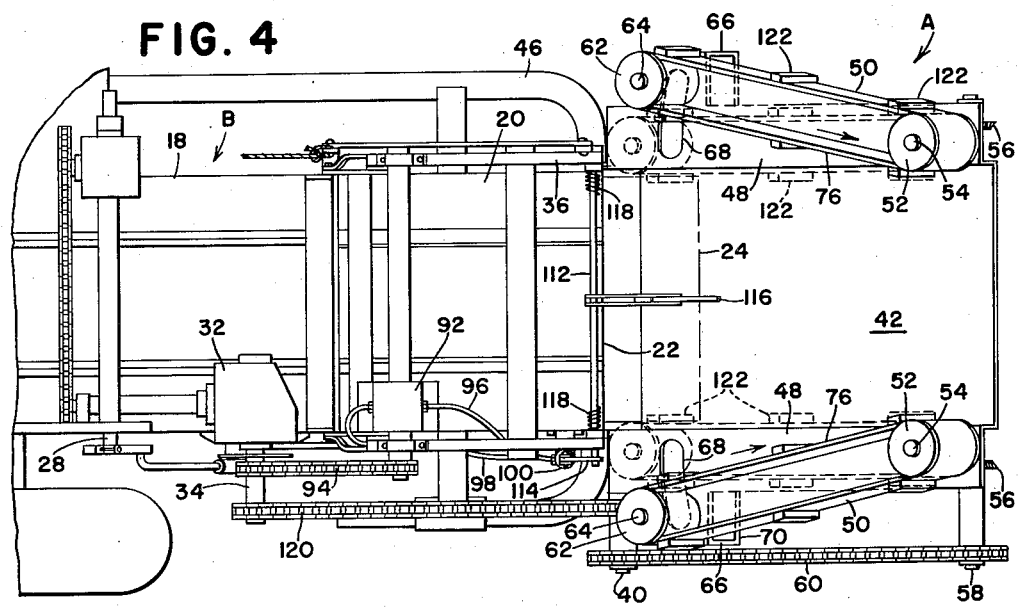
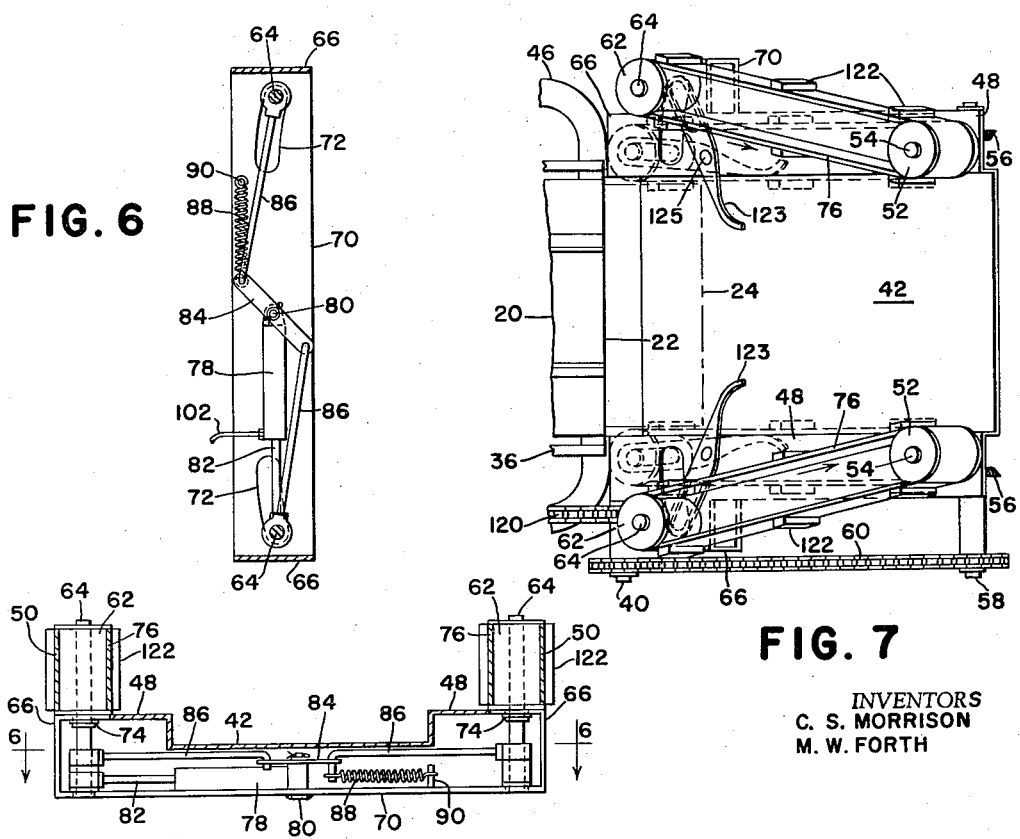
INVENTORS
C. S. MORRISON
M. W. FORTH 3,043,418
BALE-HANDLING APPARATUS
Charles S. Morrison and Murray W. Forth, Moline, Ill., assignors to Deere & Company, Moline, Ill., a corporation of Delaware
Filed Jan. 2, 1959, Ser. No. 784,757
15 Claims. (Cl. 198—128)

This invention relates to bale-handling mechanism for use with an agricultural baler of the type in which crops are picked up, compressed and formed into individual bales discharged in succession along a defined path.

The best prior art example of bale-handling mechanism of the general character referred to here is exemplified in the U.S. patent to C. S. Morrison et al. 2,756,865, wherein is disclosed a mechanism positioned at the rear of the bale case of a conventional baler and comprising means for gripping an emerging bale and being activatable to carry the bale rapidly beyond the point of discharge thereof from the bale case so that the bale is caused to travel a substantial distance for receipt by a trailer or wagon towed by the baler. Mechanism of this character has been largely instrumental in advancing the art of baling and bale-handling in the field.

The Morrison mechanism operates on the principles of intermittently activating the bale-throwing means by cyclical power means in response to the emergence of a bale from the bale case and thus utilizes drive mechanism including a selectively engageable and disengageable clutch. According to the present invention, the general characteristics of the Morrison mechanism are followed but improvements are provided in the means for moving the bale and in the means for driving the bale-moving means.

In a typical baler, each bale formed and tied forms a header for a succeeding bale and as charges of hay are packed into the succeeding bale, the previous bale is intermittently moved along through the bale case and subsequently emerges at the discharge end of the bale case. It has been proposed to provide constantly running means, such as a pair of cooperating belts, one at each side of the emerging bale, to seize the emerging bale for transporting it beyond the point of discharge from the bale case, but the disadvantage of that mechanism is that the belts must be arranged so as not to prematurely engage the bale; otherwise, tearing of the bale results because it is partly restrained by the frictional forces in the bale case or bale case extension. If the belt means is moved to a point relatively remote from the bale case discharge end, then the dimensional characteristics of the mechanism become intolerable, primarily as respects increased length.

According to the present invention, these disadvantages are eliminated by providing constantly running means arranged in such manner that they are normally disengaged from the bale until the bale has emerged to a predetermined extent. The invention features the provision of means for automatically moving the bale-engaging means into engagement with the bale at the proper time so as to cause the bale to travel beyond its point of discharge from the bale case or bale case extension. The invention is characterized by simplicity of design and construction, utilizing, in one preferred embodiment thereof, a pair of constantly running relatively inexpensive belts which are bi-positionable, having a first position in which they diverge toward the bale case so as to admit an emerging bale and having a second position, incurred in response to predetermined emergence of the bale, in which they grip the bale from opposite sides and cause the bale to depart beyond the bale case in a trajectory sufficient to enable receipt of the bale by a trailing wagon connected to the baler. The invention further features power-operated means for actuating the bale-engaging means. In a modified form of the invention, mechanical means, activated by the emerging bale, are relied upon to incur the two positions of the bale-engaging means.

The foregoing and other important objects and desirable features, inherent in and encompassed by the invention, will become apparent as preferred embodiments of the invention are disclosed, by way of examples, in the ensuing description and accompanying sheets of drawings, the several figures of which are described immediately below.

FIG. 4 is a plan of FIG. 2.

FIG. 5 is a section taken generally on the line 5—5 of FIG. 2.

FIG. 6 is a section as seen along the line 6—6 of FIG. 5.

FIG. 7 is a fragmentary plan of a modified form of control means for the bale-moving means.

Figure 1:
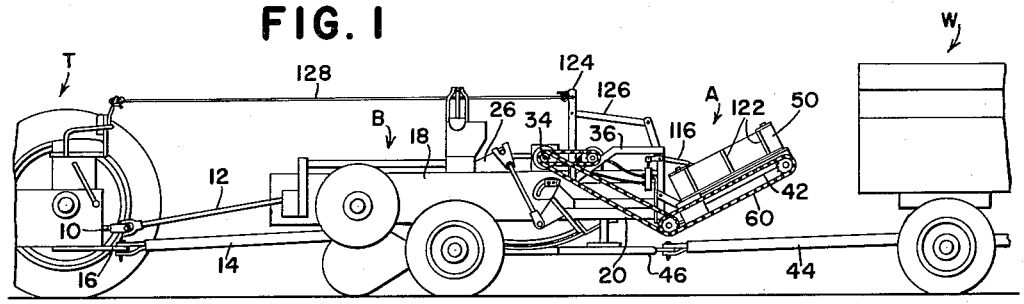
FIG. 1 is a side elevation on a reduced scale, with portions broken away, showing a vehicular train made up of a tractor, baler and trailing wagon.

The vehicular train shown in FIG. 1 is made up of a typical agricultural tractor T, an automatic pickup baler B and a trailing wagon W. The bale-handling apparatus is designated in its entirety by the letter A and in this case is mounted directly on the baler.

Figure 2:
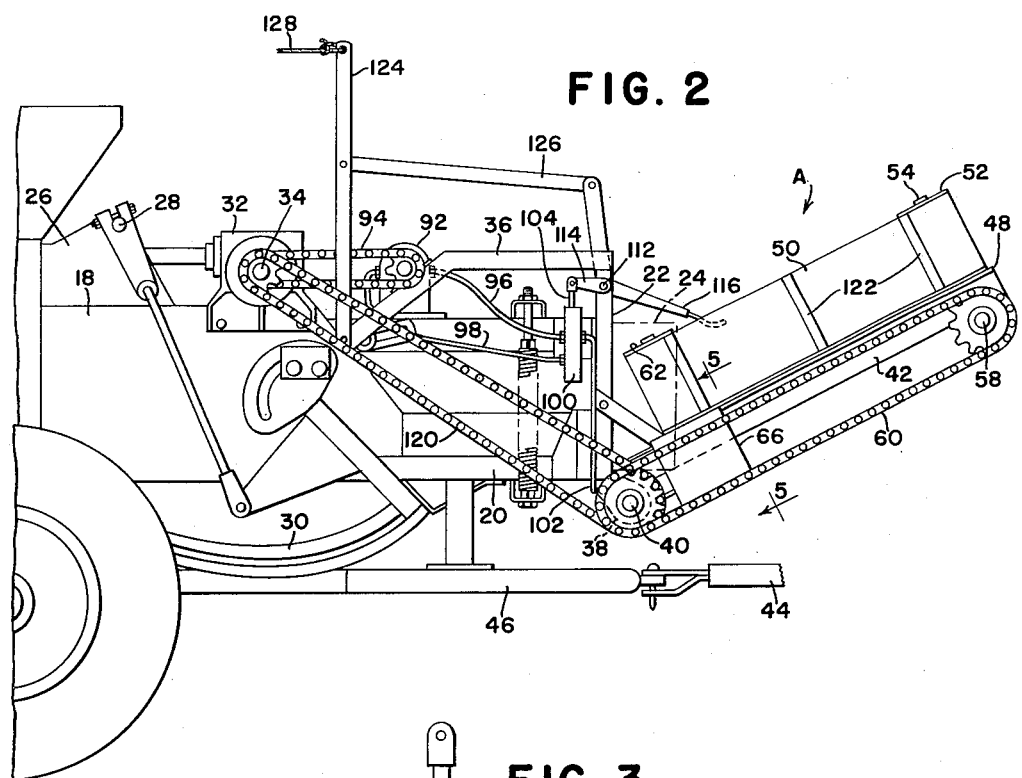
FIG. 2 is a fragmentary enlarged elevation of the rear portion of the baler and showing one form of the bale-handling apparatus.

The tractor is conventionally equipped with a rearwardly extending power take-off shaft 10 which, by means of a propeller shaft 12, drives the operating parts of the baler. The baler has a tongue 14 which is connected to the tractor draw bar at 16. The baler typically includes an elongated bale case 18 in which bales are formed and tied in the conventional manner. As each bale is completed, it is forced rearwardly through a rearward extension 20 of the bale case 18 so that it emerges through the open rear or discharge end 22 of the bale case extension. An emerging bale is shown in broken lines at 24 in FIG. 2.

As stated above, the typical baling operation involves the formation of a bale and the use of that bale as a header for the formation of a succeeding bale. Therefore, as successive charges are packed into the bale case, the previously formed bale is advanced a distance corresponding substantially to the size of the incoming charge, it being understood that the reciprocating plunger successively packs the charges until the bale reaches a predetermined length, after which automatic mechanism activates the tying mechanism. These details are not shown here, since they are assumed to be familiar to those versed in the art. However, for purposes of orienting the present structure, the general location of the tying mechanism is designated by the numeral 26, and this mechanism includes a transverse needle shaft 28 which intermittently drives a tying needle 30. A gear box 32 is illustrated as part of the driving means for the tying mechanism, receiving power in the first instance from the tractor via the power takeoff shaft 10 and propeller shaft 12. The drive means could be other than illustrated but that shown is referred to here for the purpose of establishing a shaft 34, projecting laterally from the gear box 32, as a driving shaft for the bale-handling apparatus A.

It should be noted further at this point that the baler illustrated here is of the type having its bale case fore-and-aft, which represents the commercially most popular type; although, other balers are known in which the bale case is transverse to the line of travel. Nevertheless, on the basis of the teachings of the present disclosure and that of the Morrison patent, the principles of the invention can be exploited in either case. Accordingly, the details and characteristics of the baler do not establish limitations on the scope and spirit of the invention.

Another characteristic of the present invention is that the bale-handling apparatus A is mounted directly on the baler; although, it could be otherwise disposed and connected to the machine. For present purposes, the direct mounting includes framework 36 attached to the bale case extension 20 and providing a lower support means 38 in which is journaled a transverse shaft 40. This shaft carries a rearwardly and upwardly inclined bale receiver or chute 42, the angle or inclination of which is determined, at least to some extent, by the dimensional characteristics of the wagon W, which has a tongue 44 connected to a baler draw bar or hitch 46. The chute 42 thus forms what may be regarded as a prolongation or extension of the lower part or floor of the bale case extension 20 and thus is in rearward alinement with the bale case discharge end or opening 22. Therefore, bales emerging in succession from the bale case discharge end 22 will be received, at least in part, by the chute 42 and, by means of mechanism to be described below, such bales are caused to travel rearwardly and upwardly for receipt by the wagon W. The bale-moving mechanism is designed to operate in such manner that the bales are literally thrown rearwardly to the wagon.

As best seen in FIG. 5, the chute 42 is in the nature of a relatively sturdy trough having an intermediate portion of a width corresponding generally to the width of the bale 24, and these flanges serve to carry, respectively, a pair of bale-engaging or -moving means, here in the form of a pair of endless belt means 50.

Each belt is carried at its end remote from the bale case discharge end 22 by means of a roller 52 and shaft 54, the axis of which is perpendicular to the respective trough or chute flange 48. Any suitable means may be relied upon for journaling the shaft 54 in the position indicated. The shaft may project downwardly beyond the flange to be driven, as by beveled gearing 56 (FIG. 4) which is in turn driven by a transverse rear shaft 58 which is chain-driven at 60 from the previously described shaft 40. Each belt is carried at its front end by a roller 62 on a shaft 64 proximate to the bale case discharge end 22, which thus distinguishes this end of the belt from the other end, which is remote from the bale case discharge end. Another distinction lies in the mounting of the shaft 64 and roller 62, because this end of the belt is capable of occupying two positions, one of which is shown in full lines and the other of which is shown in dotted lines in FIG. 4. For the purpose of achieving the bi-positionable characteristics of this end of the belt, the proximate chute flange 48 has a lateral outward extension 66 which has therein a slot 68 formed on an arc having the remote or rear shaft axis as its center. The lateral extensions 66 of the trough flanges 48 are continued downwardly and are then joined beneath the trough by a transverse member 70 which has arcuate slots 72 corresponding respectively to the upper slots 68. The shafts 64 are extended downwardly and are appropriately guided in the respective paired slots 68—72 as best suggested by the respective paired slots 68—72 in FIG. 5. Any other type of mounting could be utilized to achieve the bi-positionable characteristics of the two belt means 50, the significant characteristics of which are that the upper or rear or remote ends of the belts, as represented by the rollers 52, are spaced apart transverse to the line of travel of the bale by a spacing substantially equal to the width of the bale, and the proximate ends of the belts, as represented by the rollers 62, are capable of occupying outer positions (full lines, FIG. 4) in which the transverse spacing is greater than the width of the bale, and inner positions (dotted lines, FIG. 4) in which the spacing is on the order of that of the rear ends of the belts. Stated otherwise, the belt means in their full-line positions are disposed so that their inner runs 76 diverge toward the discharge end 22 of the bale case, thus admitting the emerging bale 24 between them while they are still clear of or out of engagement with the bale. Consequently, there is no interference between the belts and the normal emergence of the bale; although, as will be brought out below, a predetermined amount of emergence of the bale sets into effect means for moving the belts automatically to their dotted-line positions so that they engage the bale and cause it to move rearwardly beyond the discharge end 22 of the bale case.

One form of operating and control means for achieving the two positions of the belts 50 is illustrated best in FIGS. 5 and 6 as comprising a force-exerting device, here in the form of a hydraulic cylinder 78 pivotally mounted at one end at 80 on the transverse support member 70 and having a piston rod 82 connected to one of the front roller shafts 64. As representative structure, the pivot 80 may be extended to carry a lever 84 having opposite ends connected by links 86 to the shafts 64. A tension spring 88, connected between one end of the lever 84 and an anchor point 90 on the member 70, serves as biasing means to yieldably maintain the wide-spaced positions of the proximate ends of the belts 50.

The closed or inner positions of the belts 50 are achieved by supplying fluid under pressure to the end of the cylinder so as to contract the same. The piston rod 82 pulls inwardly on one shaft 64 and the interconnecting linkage 84—86 simultaneously incurs inward movement of the other shaft 64. When fluid pressure is released, the spring 88 returns the proximate ends of the belts to their outer positions.

Figure 3:
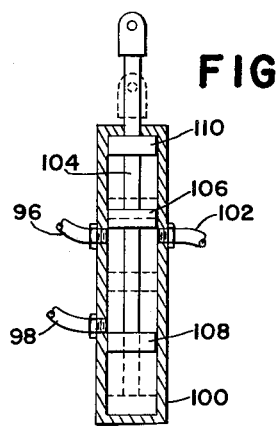
FIG. 3 is an enlarged section of the hydraulic valve used in the power-operated means for controlling the bale-handling apparatus.

For the purpose of supplying fluid to the cylinder 78, the baler may be equipped with a pump, a representative illustration of which appears at 92. This pump may be chain driven at 94 from the shaft 34 and has pressure and return lines 96 and 98, respectively, leading to a control valve 100. This valve is connected by a line 102 to the cylinder 78. The valve is shown by itself in FIG. 3, from which it will be seen that a valve piston 104 occupies an idle position in which the space between intermediate and lower lands 106 and 108, respectively, communicates the lines 96 and 98 so that the pump, constantly driven, can circulate fluid at no appreciable pressure. The space between these two lands also is in communication with the line 102 so that the cylinder is connected to the intake or reservoir side of the pump 92. When the valve piston 104 is moved downwardly, as shown in dotted lines in FIG. 3, the intermediate land 106 and a spaced upper land 110 afford between them a space or groove which communicates the lines 96 and 102 to the exclusion of the line 98, whereby fluid under pressure is supplied to the cylinder 78 for contracting the same to achieve the inner or operative position of the belts 50.

The valve, comprising part of the control and operating means for the apparatus, is automatic in the sense that it operates in response to a predetermined amount of emergence of the bale 24 from the bale discharge end 22 of the baler. For this purpose, the framework 36 carries a transverse rockshaft 112 which has at one end an arm 114 connected to the upper end of the valve piston 104 and which has intermediate its ends a feeler or sensing member 116 designed to project into the path of the emerging bale 24. Torsion springs 118 on the rockshaft 112 yieldably maintain the rockshaft 112 in a clockwise direction but of course are yieldable to permit counterclockwise rocking of the rockshaft 112 when the bale 24 emerges sufficiently to contact and displace upwardly the feeler 116.

At the beginning of the operating cycle, the bale 24, constituting a header for a succeeding bale, will lie mainly in the bale case extension 20, but will emerge in increments as successive charges of hay are accumulated in the bale case in the formation of the succeeding bale. As the succeeding bale nears completion, the bale 24 will continue to emerge from the bale case discharge end 22, being received and guided by the chute 42. The belts 50 will be in their outer or forwardly diverging positions, and these belts will be constantly running so that the inner runs 76 thereof travel rearwardly as indicated by the arrows in FIG. 4. The constant drive to the belts is established by a chain 120 between the baler shaft 34 and the lower shaft 40 for the apparatus A. Since the belts diverge as just described they are clear of the emerging bale 24, but as soon as the bale 24 emerges to a predetermined extent, the bale moves the feeler 116 upwardly so that the rockshaft 112 rocks in a counterclockwise direction to move the valve piston 104 downwardly, thereby establishing the transmission of fluid under pressure from the pump 92 to the cylinder 98, which contracts to move the belts to their parallel or operating positions. The belts may be equipped with suitable lugs 122 to improve their traction on the bale so as to assure proper travel of the bale rearwardly at an adequate speed to cause it to be thrown directly to the trailing wagon W. As the traveling bale departs from the feeler 116, the feeler returns to its normal position and the valve piston 104 is moved to its full-line position of FIG. 3. The coordination between bale emergence, completion of a bale following the emerging bale and departure of the thrown bale from the belts 50 is largely a matter of design, depending upon the size of the bales being handled. In a machine of this character, it is preferable that the bales be made somewhat shorter than conventional bales. As is known to those versed in the art, the length of a bale can be predetermined by appropriate setting of the measuring mechanism forming part of any automatic baler. It is preferred that tripping of the feeler 116 occur when the bale following the emerging bale is completed, so that the emerging bale is no longer needed as the header, that function being now performed by the completed succeeding bale. Likewise, as respects departure of the traveling bale from the belts 50, it will be noted that even though the feeler 116 is released by the rearwardly moving bale so that the proximate or forward ends of the belts move outwardly, the remote or rearward ends of the belt are still in position to establish driving engagement with the bale. As previously pointed out, one significant feature of the apparatus is that the proximate ends of the belts may be located close to the discharge end 22 of the bale case, and this is possible because of the bi-positionable proximate ends of the belts. In other words, the belts are clear of the emerging bale until the bale is freed from its function as part of the baling operation. Consequently, the overall length of the apparatus may be made relatively short.

In the modified form of structure shown in FIG. 7, the general characteristics as described above are the same, with the exception that different means are provided for causing the belts to move inwardly and outwardly. In this case, instead of the feeler 116 and the power-operated means, the operation depends upon a pair of levers 123, pivoted at 125 respectively on the trough side flanges 48, and projecting into the path of the emerging bale. The belts may be biased to their outer positions as illustrated in full lines. As the bale emerges onto the chute 42 and between the forwardly diverging belts, the rear end thereof engages the levers 123 and swings them to the dotted line positions illustrated. The outer ends of the levers are connected to the associated shafts 64 so that the proximate ends of the belts are brought into the operating positions. If desired, one lever 123 could be used and the two shafts 64 could be interconnected by linkage and lever means such as that shown in FIG. 6.

In the form of the invention shown in FIGS. 1-6, manual means may be provided for tripping the rockshaft 112 if desired. For this purpose, a lever 124 may be suitably pivoted to the framework 36 and may be linked to the rockshaft at 126. A pull rope 128 may extend forwardly to the tractor for convenience of the tractor operator.

The need for a manual control is demonstrated primarily in the operation of the vehicular train when turning corners. For example, on a corner the wagon will be misalined relative to the apparatus A and if the operator can trip the mechanism prior to its normal time he can avoid automatic tripping which might throw the bale during that particular moment in which the wagon and baler are out of alinement, in which case automatic tripping might result in missing the wagon completely.

On the basis of the two control and operating means illustrated, other designs will readily suggest themselves. Likewise, it should be recognized that many of the details shown are only representative of how the invention may be exploited without departure from the spirit and scope thereof.

What is claimed is:

1. For a baler having a bale case in which bales are successively formed and discharged and including a discharge end through which bales successively emerge: bale-handling apparatus for causing successive emerging bales to travel beyond said discharge end, comprising support means adapted for connection to the baler and including a baler receiver positionable generally as an extension of the bale case and alined with the bale case discharge end; a pair of conveyor belt means on the support means, and spaced apart crosswise of and lying along the receiver and adapted to flank an emerging bale, each belt means having one end proximate to and another end remote from the bale case discharge end and an inner run extending between said ends; means mounting the remote ends of the belt means on the support means in spaced apart relation transverse to the direction of movement of the emerging bale and at a spacing generally on the order of the transverse dimension of such bale, said mounting means respectively including pivots about which the belt means are swingable to dispose their proximate ends selectively between outer positions spaced apart greater than the transverse dimension of a bale and inner positions spaced apart on the order of the spacing of said remote ends; operating means connected to the belt means for initially incurring the outer positions of said proximate ends whereby the belt means diverge toward the bale case discharge end to admit an emerging bale therebetween; control means connected to the belt means and operative in response to a predetermined amount of bale emergence to incur said inner positions of said proximate ends so that the emerging bale is engaged by said inner runs; and means for driving the belt means to cause their inner runs to travel in the direction of bale emergence so as to convey said bale beyond the bale case discharge end.

2. The invention defined in claim 1, including: means responsive to departure of the bale from the belt means to restore the proximate ends of the belt means to their outer positions so as to be conditioned to admit a succeeding emerging bale.

3. The invention defined in claim 1, in which: the means for driving the belt means is constantly running so that the belt means are likewise constantly running.

4. The invention defined in claim 1, in which: the operating means for incurring the outer positions of the proximate ends of the bale means includes biasing means; and the means for incurring the inner positions of said proximate ends includes power-operated means operative in response to said predetermined amount of bale emergence to overcome the biasing means.

5. The invention defined in claim 1, in which: the operating means for incurring the outer positions of the proximate ends of the bale means includes biasing means; and the means for incurring the inner positions of said proximate ends includes mechanical means engageable by the emerging bale and connected directly to the belt means to overcome the biasing means.

6. For a baler having a bale case in which bales are successively formed and discharged and including a discharge end through which bales successively emerge: bale-handling apparatus for causing successive emerging bales to travel beyond said discharge end, comprising: support means adapted for connection to the baler and including a bale receiver positionable generally as an extension of the bale case and alined with the bale case discharge end; a pair of bale-engaging means on the support means and spaced apart crosswise of and lying along the receiver and adapted to flank an emerging bale, each engaging means having one end proximate to and another end remote from the bale case discharge end and one of said engaging means comprising a conveyor extending between its said ends; means mounting the remote ends of the two engaging means on the support means in spaced apart relation transverse to the direction of movement of the emerging bale and at a spacing generally on the order of the transverse dimension of such bale, the mounting means for said one means that includes the conveyor having a pivot about which said conveyor is swingable toward and away from the other engaging means so as to selectively vary the position of the proximate end of the conveyor between an outer position spaced from the proximate end of the other engaging means a distance greater than the transverse dimension of said bale and an inner position spaced from said other proximate end on the order of the spacing of said remote ends; operating means connected to the conveyor for initially incurring the outer position of said conveyor proximate end whereby the two engaging means diverge toward the bale case discharge end to admit an emerging bale therebetween; control means connected to the conveyor and operative in response to a predetermined amount of bale emergence to incur said inner position of said conveyor proximate end so that the emerging bale is engaged between the two engaging means; and means for driving the conveyor to travel in the direction of bale emergence so as to convey said bale beyond the bale case discharge end.

7. The invention defined in claim 6, in which: the conveyor driving means is constantly running so as to drive the conveyor constantly irrespective of its position.

8. The invention defined in claim 7, including: means responsive to departure of the bale from the two engaging means to restore the proximate end of the conveyor to its outer position so as to condition the engaging means to admit a succeeding emerging bale.

9. For a baler having a bale case in which bales are successively formed and discharged and including a discharge end through which bales successively emerge: bale-handling apparatus for causing successive emerging bales to travel beyond said discharge end, comprising support means adapted for connection to the baler; bale-moving means carried by the support means at the discharge end of the bale case and including a constantly running bale-engaging element moving in the direction of bale emergence and traveling from the bale case discharge end to a point relatively remote from said discharge end and a carrier for said element; means mounting said carrier for shifting, while said element is traveling as aforesaid, from a first position in which said element is clear of an emerging bale so as to enable predetermined bale emergence free of said element to a second position in which said element engages the emerging bale; operating means connected to and for incurring the first position of said carrier; and means responsive to a predetermined amount of emergence of the bale to incur said second position of the element so as to cause the bale to be engaged and moved by the element away from the bale case discharge end.

10. For a baler having a bale case in which bales are successively formed and discharged and including a discharge end through which bales successively emerge: bale-handling apparatus for causing successive emerging bales to travel beyond said discharge end, comprising support means adapted for connection to the baler; bale-moving means carried by the support means at the discharge end of the bale case and including a pair of cooperative constantly running bale-engaging elements moving in the direction of bale emergence and traveling from the bale case discharge end to a point relatively remote from said discharge end; a pair of carriers respectively carrying said elements; means mounting said carriers for movement relative to each other and relative to the emerging bale between outer positions, spaced apart transversely to the direction of bale emergence so that the elements are clear of the emerging bale whereby to admit an emerging bale therebetween, and inner positions spaced apart closely enough to cause the constantly running elements to grip the emerging bale for moving said bale beyond the bale case discharge end; operating means connected to and for incurring the outer positions of said carriers as the bale emerges from the bale case discharge end; and means responsive to a predetermined amount of emergence of the bale to incur said inner positions of said carriers so that said elements engage the bale and move it away from said discharge end.

11. The invention defined in claim 10, including: means on said elements causing the gripped bale to depart from said elements after predetermined travel of the bale with said elements; and means operative upon departure of the bale from said elements for incurring the outer positions of the carriers so as to admit a succeeding emerging bale between the elements.

12. For a baler having a bale case in which bales are successively formed and discharged and including a discharge end through which bales successively emerge: bale-handling apparatus for causing successive emerging bales to travel beyond said discharge end, comprising support means adapted for connection to the baler; bale-moving means carried by the support means at the discharge end of the bale case and including a bale-engaging element; means mounting said element for shifting from a first position clear of an emerging bale so as to enable predetermined bale emergence free of said element to a second position engaging the emerging bale; operating means connected to and for incurring the first position of said element; means responsive to a predetermined amount of emergence of the bale to incur said second position of the element; and means for driving the element to travel in the direction of bale emergence so as to cause the element-engaged bale to be moved beyond the bale case discharge end.

13. For a baler having a bale case in which bales are successively formed and discharged and including a discharge end through which bales successively emerge: bale-handling apparatus for causing successive emerging bales to travel beyond said discharge end, comprising support means adapted for connection to the baler; a pair of bale-engaging means on the support means beyond the discharge end of the bale case and arranged to flank an emerging bale, one of said bale-engaging means comprising a conveyor movable in the direction of bale emergence; means mounting the two bale-engaging means on the support means for movement of the conveyor from an outer position, spaced away from the other bale-engaging means a distance greater than the transverse dimension of an emerging bale, to an inner position spaced from said other bale-engaging means on the order of said transverse dimension of the bale so that the emerging bale is seized between the conveyor and said other bale-engaging means; means responsive to the emergence of a bale to a predetermined extent to incur the inner position of the conveyors; and means for driving the conveyor so that an emerged bale, seized as aforesaid, is moved by the conveyor beyond the discharge end of the bale case.

14. The invention defined in claim 9, in which: said element is constructed and operative to move the engaged bale through a predetermined range of travel away from said discharge end to a point at which said bale is caused to depart from said element; and means connected to the carrier and operative when the bale attains said point of departure to incur said first position of said carrier so as to enable predetermined emergence of a succeeding bale.

15. For a baler having a bale case in which bales are successively formed and discharged and including a discharge end through which bales successively emerge: bale-handling apparatus for causing successive emerging bales to travel beyond said discharge end, comprising support means adapted for connection to the baler; a pair of bale-engaging devices on the support means beyond the discharge end of the bale case and arranged to flank an emerging bale, one of said devices being movable in the direction of bale emergence; means mounting the two devices on the support means for movement of one device from an outer position, spaced away from the other device a distance greater than the transverse dimension of an emerging bale, to an inner position spaced from said other device on the order of said transverse dimension of the bale so that the emerging bale is seized between the two devices; means responsive to the emergence of a bale to a predetermined extent to incur the inner position of said one device; and means for driving said device so that an emerged bale, seized as aforesaid, is moved by the conveyor beyond the discharge end of the bale case.

References Cited in the file of this patent

UNITED STATES PATENTS

| | | |
|---|---|---|
| 329,687 | Tanger | Nov. 3, 1885 |
| 1,495,799 | Raynuad | May 27, 1924 |
| 2,089,516 | West et al. | Aug. 10, 1937 |
| 2,490,381 | Shields | Dec. 6, 1949 |
| 2,652,769 | Wehr | Sept. 22, 1953 |
| 2,680,530 | Bright et al. | June 8, 1954 |
| 2,809,741 | Keilig | Oct. 15, 1957 |
| 2,862,606 | Schlichting | Dec. 2, 1958 |